US008675337B2

(12) United States Patent
Baniecki et al.

(10) Patent No.: US 8,675,337 B2
(45) Date of Patent: Mar. 18, 2014

(54) VARIABLE CAPACITOR AND FILTER CIRCUIT WITH BIAS VOLTAGE

(75) Inventors: John D. Baniecki, Kawasaki (JP); Masatoshi Ishii, Kawasaki (JP); Kazuaki Kurihara, Kawasaki (JP); Kazunori Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 12/418,887

(22) Filed: Apr. 6, 2009

(65) Prior Publication Data

US 2009/0273880 A1  Nov. 5, 2009

(30) Foreign Application Priority Data

May 2, 2008  (JP) ................................ 2008-120219

(51) Int. Cl.
*H01G 5/00* (2006.01)
*H03H 7/00* (2006.01)

(52) U.S. Cl.
USPC .......................................... 361/277; 333/174

(58) Field of Classification Search
USPC .................. 361/277, 292, 322, 306.3, 283.3; 333/174
See application file for complete search history.

(56) References Cited

U.S. PATENT DOCUMENTS

| | | | | |
|---|---|---|---|---|
| 3,569,795 A | * | 3/1971 | Gikow | 361/434 |
| 5,216,572 A | | 6/1993 | Larson et al. | |
| 6,100,773 A | * | 8/2000 | Nakamichi et al. | 361/281 |
| 6,599,447 B2 | * | 7/2003 | Stauf et al. | 252/520.21 |
| 6,806,553 B2 | * | 10/2004 | Yashima et al. | 257/532 |
| 7,092,232 B2 | * | 8/2006 | Yamagata et al. | 361/277 |
| 7,142,072 B2 | * | 11/2006 | Katta | 333/32 |
| 7,161,200 B2 | | 1/2007 | Baniecki et al. | |
| 7,867,869 B2 | | 1/2011 | Baniecki et al. | |
| 8,344,386 B2 | | 1/2013 | Baniecki et al. | |

FOREIGN PATENT DOCUMENTS

| | | | |
|---|---|---|---|
| JP | 06-013572 | A | 1/1994 |
| JP | 10-93050 | A | 4/1998 |
| JP | 2004-031408 | A | 1/2004 |
| JP | 2006-73850 | A | 3/2006 |
| JP | 2006-128302 | A | 5/2006 |

OTHER PUBLICATIONS

JP 10-093050 Apr. 1998 Translation.*
Definition of "relative permittivity" from www.wikipedia.org.*
Bao-Dong Qu et al. "Condensed Matter," Journal of Physics; Mar. 18, 2008.
A. K. Tagantsev et al. "Ferroelectric Materials for Microwave Tunable Applications," Journal of Electroceramics, 11, 2003, pp. 5-66.
Japanese Office Action dated Jul. 30, 2013, issued in corresponding Japanese Patent Application No. 2009-107778 with English translation (4 pages).

\* cited by examiner

*Primary Examiner* — Chau Nguyen
*Assistant Examiner* — Roshn Varghese
(74) *Attorney, Agent, or Firm* — Westerman, Hattori, Daniels & Adrian, LLP

(57) ABSTRACT

A variable capacitor includes a metal oxide film having a perovskite structure, first and second electrode films having the metal oxide film placed therebetween and to be coupled to an external voltage source, and a bias voltage source configured to provide a bias voltage that is applied in series or parallel to a capacitance of a capacitor including the metal oxide film and the first and second electrode films, wherein the bias voltage applied by the bias voltage source to the capacitance is adapted to maximize a voltage dependency of a relative permittivity of the metal oxide film.

16 Claims, 17 Drawing Sheets $E = a(T)D + bD^3$ $$V_{ext} = (ad/A)Q + (bd/A^3)Q^3$$
$$+/-V_{off}$$

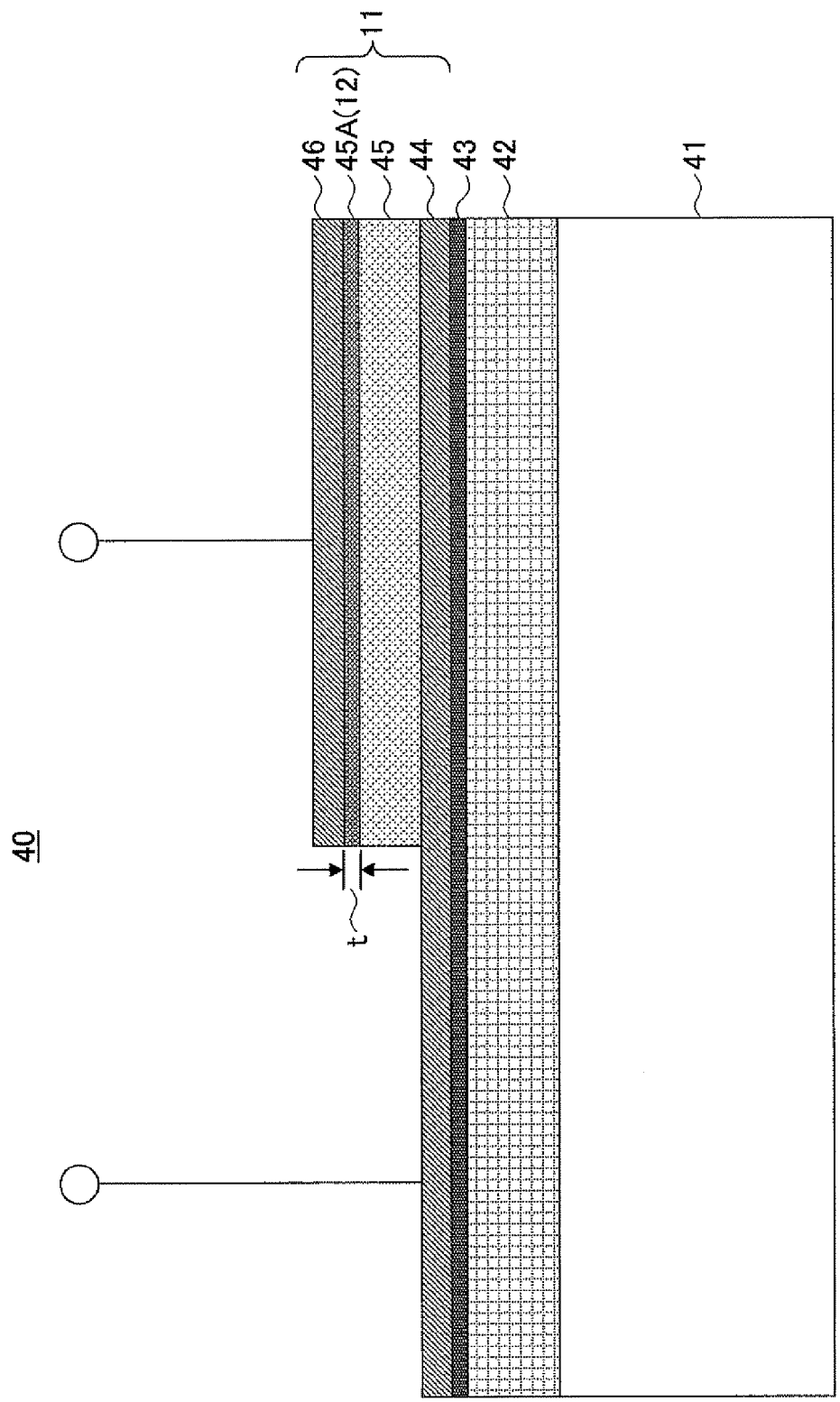

$$V_{ext} = (ad/A)Q + (bd/A^3)Q^3$$
$$+/-V_{off}$$

$V_{ext} = (ad/A)Q + (bd/A^3)Q^3$
$+/-V_{off}$

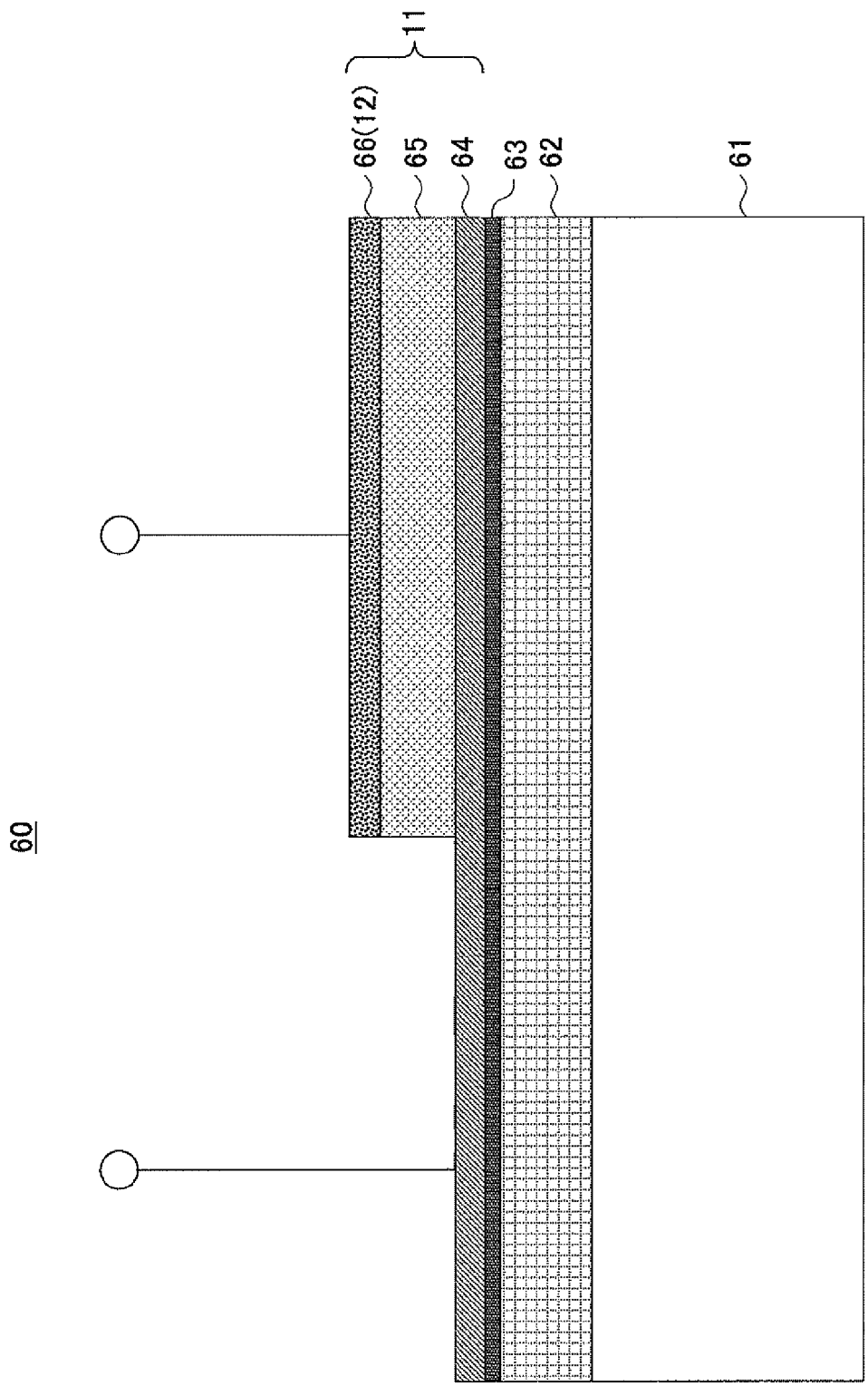

VARIABLE CAPACITOR AND FILTER CIRCUIT WITH BIAS VOLTAGE

CROSS-REFERENCE TO RELATED APPLICATIONS

The present application is based upon and claims the benefit of priority from the prior Japanese Patent Application No. 2008-120219 filed on May 2, 2008, with the Japanese Patent Office, the entire contents of which are incorporated herein by reference.

FIELD

The disclosures herein generally relate to a thin-film capacitor, and particularly relate to a variable capacitor implemented by use of a thin-film capacitor whose capacitance is changed in response to an applied voltage.

BACKGROUND

A variable capacitor formed of a thin-film capacitor has a capacitance thereof changeable according to an applied voltage. Such a variable capacitor is expected to be used in a microwave phase shifter, a phased array antenna, a on-vehicle radar device, etc.

For a thin-film or thick-film capacitor that utilizes a metal oxide thin film having a perovskite structure and capable of manifesting a first-order or second-order phase transition, the Landau-Ginzburg-Devonshire theory teaches that electric field E applied to the metal oxide thin film and electric displacement D are related as follows by use of coefficients "a" and "b" (see Non-Patent Document 2).

$$E = aD + bD^3 \quad (1)$$

According to the Landau-Ginzburg-Devonshire theory, the coefficient "a" is a first-order function of a temperature while the coefficient "b" has no or little temperature dependency.

By use of $\epsilon = dD/dE$, a relative permittivity $\epsilon$ of the metal oxide film is expressed as follows.

$$\epsilon = 1/(a + 3bD^2) \quad (2)$$

FIG. 1 illustrates a thin-film or thick-film capacitor including a metal oxide film 1 having a perovskite structure of a thickness d and electrodes 2 and 3 of an area size A such that the metal oxide film 1 is placed between the electrodes 2 and 3. For such a capacitor, above-noted formula (2) is modified by use of an electric charge Q and an externally applied voltage V as follows.

$$V = (ad/A)Q + (bd/A^3)Q^3 \quad (3)$$

By use of formula (3), a capacitance C is expressed as follows.

$$C = dQ/dV = 1/(ad/A + (3bd/A^3)Q^2) \quad (4)$$

Formula (4) indicates that the capacitance C can be changed as depicted in FIG. 2, for example, in response to a voltage change in the case of a thin-or-thick-film capacitor illustrated in FIG. 1.

FIG. 2 illustrates a capacitance-voltage characteristic curve for a thin-film capacitor in which BST ($BaSrTiO_3$) with a film thickness of 80 nm is used as the metal oxide film 1 and Pt is used as the electrodes 2 and 3.

As can be seen from FIG. 2, the capacitance C becomes the maximum around a point where the externally applied voltage V is 0 V. Further, the capacitance C decreases as the externally applied voltage V is changed from 0 V in either a positive direction or a negative direction.

A careful review of the characteristic curve illustrated in FIG. 2 reveals that the slope of the characteristic curve becomes gentle around the peak of the characteristic curve, i.e., around a point where the voltage V is zero volt. The orientation of the characteristic curve becomes horizontal at the point at which the voltage V is zero volt.

Accordingly, the related-art variable capacitor as illustrated in FIG. 2 has a small capacitance change when the capacitor is of a small size with a small drive voltage. It is thus difficult to provide a desired characteristic change for a filter circuit or the like.

[Patent Document 1] Japanese Patent Application Publication No. 10-93050

[Non-Patent Document 1] Qu, B., et al. J. Phys., Condens. Matter 6 1207-1212, Feb. 7, 1994

[Non-Patent Document 2] Taganstev. A. K., et al., J. Electroceramics, 11, 5-66, 2003

SUMMARY

According to an aspect of the embodiment, a variable capacitor includes a metal oxide film having a perovskite structure, first and second electrode films having the metal oxide film placed therebetween and to be coupled to an external voltage source, and a bias voltage source configured to provide a bias voltage that is applied in series or parallel to a capacitance of a capacitor including the metal oxide film and the first and second electrode films, wherein the bias voltage applied by the bias voltage source to the capacitance is adapted to maximize a voltage dependency of a relative permittivity of the metal oxide film.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8A is a drawing illustrating a variable capacitor according to a second embodiment;

FIG. 9 is a drawing illustrating a variable capacitor according to a third embodiment;

DESCRIPTION OF EMBODIMENTS

First Embodiment

Figure 2:
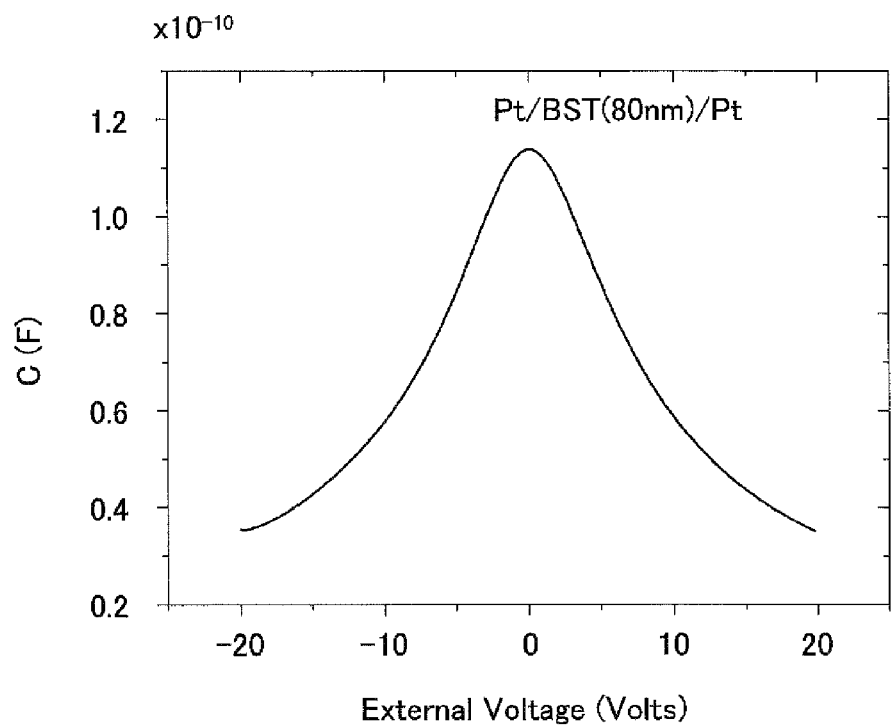
FIG. 2 is a drawing illustrating the electrical characteristics of the related-art thin-film capacitor illustrated in FIG. 1.
Figure 3:
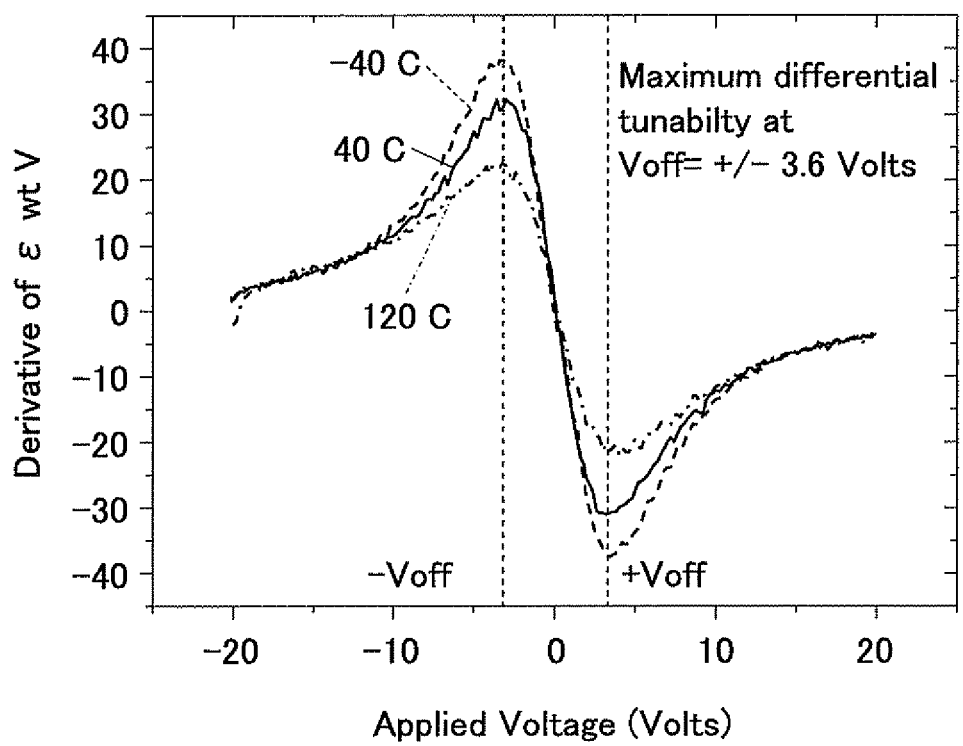
FIG. 3 is a diagram for explaining a first embodiment.

FIG. 3 is a drawing illustrating the derivative (i.e., differential coefficient) of a relative permittivity $\epsilon$ with respect to voltage V obtained for a capacitor having the characteristics curve illustrated in FIG. 2. What is illustrated in FIG. 3 was obtained through a background study conducted by the inventors of the present invention.

As can be seen from FIG. 3, the rate of change in the relative permittivity $\epsilon$ with respect to voltage becomes zero or extremely small around a point where the applied voltage V is zero volt. Further, the rate of change in the relative permittivity $\epsilon$ with respect to voltage becomes the maximum around points where the applied voltage V is ±3.6 V.

Figure 1:
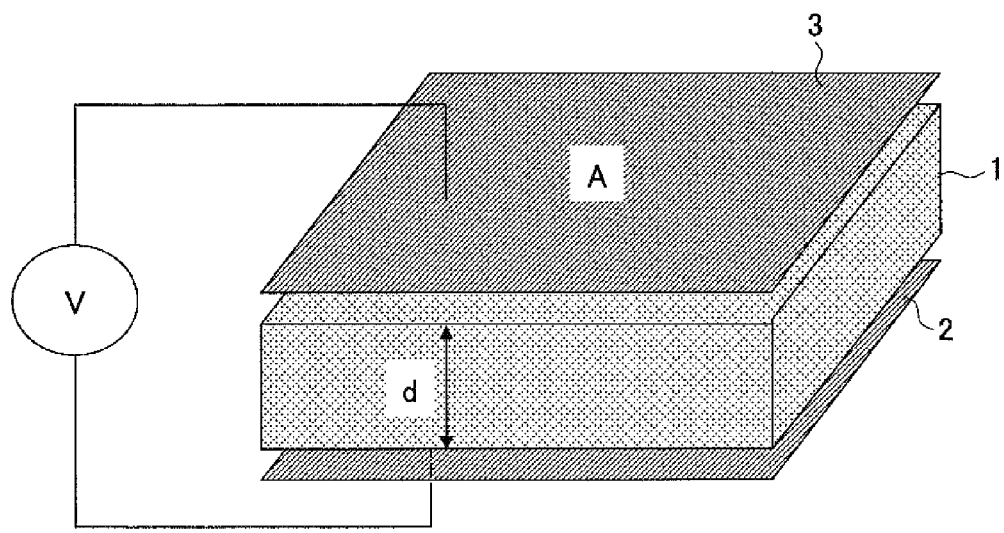
FIG. 1 is a drawing illustrating a related-art thin-film capacitor.

In today's electronic devices, the operating voltage is reduced for the purpose of achieving high speed operation. Variable capacitors controlled by voltage are no exception. It is obvious, however, from FIG. 2 and FIG. 3 described above that a sufficient capacitance change cannot be obtained when the variable capacitor of FIG. 1 is driven around the zero-volt point Against this background, the inventors of the present invention found that the differential coefficient of the relative permittivity $\epsilon$ with respect to voltage, i.e., a voltage dependency, becomes the maximum at points at which the voltage applied to the variable capacitor is displaced either in a positive direction or in a negative direction from the conventional operating point corresponding to the zero-volt applied voltage, as demonstrated in FIG. 3.

When the capacitance-voltage characteristic curve of a variable capacitor is symmetric between the positive-voltage side and the negative-voltage side as illustrated in FIG. 2, the voltage dependency of the relative permittivity $\epsilon$ becomes the maximum when the applied voltage is Voff, which is expressed within 20% by use of formula (4) as follows.

$$Voff = \pm[(6a^3/126b)^{1/2} + (6a/126b^{1/3})^{3/2}]d \quad (5)$$

When the metal oxide film of the variable capacitor has a defect, the center of symmetry of the capacitance-voltage characteristic curve illustrated in FIG. 2 may deviate from 0 V by a built-in voltage $\Delta V$ due to such a defect. In this case, the above-noted applied voltage Voff is expressed as follows.

$$Voff = [(6a^3/126b)^{1/2}(6a/126b^{1/3})^{3/2}]d - \Delta V \quad (6)$$

The built-in voltage $\Delta V$ is negative when the capacitance-voltage characteristic curve is shifted in a positive direction (toward positive voltages).

Figure 4A:
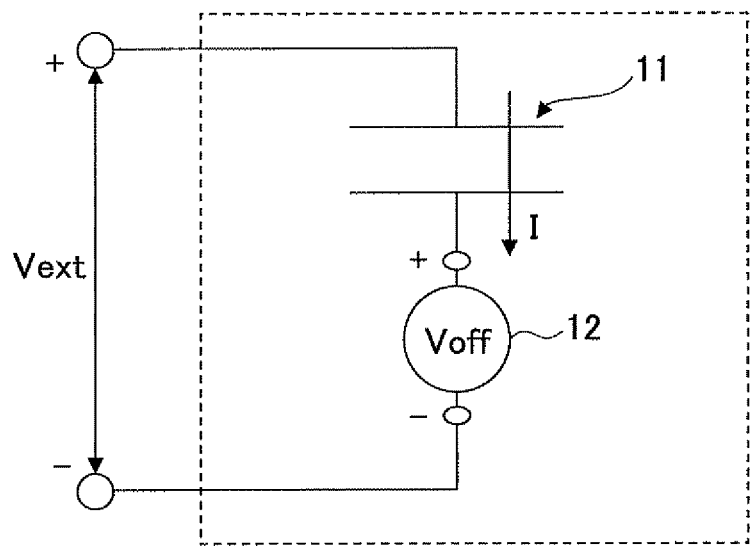
FIG. 4A is a drawing illustrating a variable capacitor according to the first embodiment.
Figure 4B:
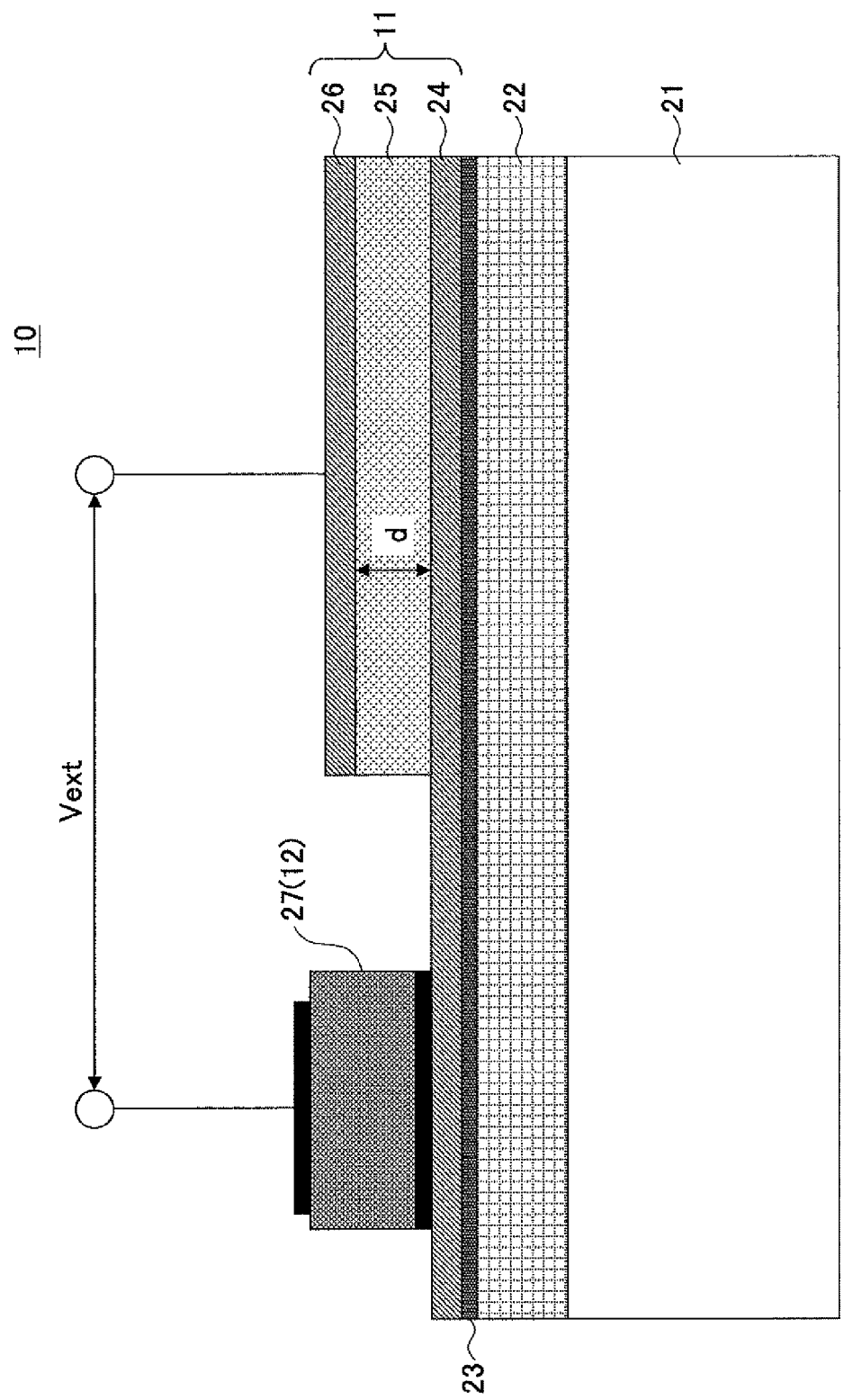
FIG. 4B is a drawing illustrating the variable capacitor according to the first embodiment.

FIG. 4A is an equivalent circuit diagram of a variable capacitor 10 according to a first embodiment. FIG. 4B is a cross-sectional view of the variable capacitor 10.

As is illustrated in FIG. 4A, the variable capacitor 10 includes a capacitor 11 and a direct-current voltage source 12. The capacitor 11 has a metal oxide thin film having a perovskite structure as illustrated in FIG. 4B. The direct-current voltage source 12 generates a bias voltage Voff that is applied in series to the capacitor 11 with polarity as illustrated. A drive voltage Vext for changing the capacitance of the capacitor 11 of the variable capacitor 10 is applied to the variable capacitor 10 via the direct-current voltage source 12.

Referring to FIG. 4B, the thin-film capacitor 11 is formed on a silicon substrate 21 having an insulating film 22 thereon such as a thermal oxide film, with an intervening glue layer 23 made of Ti or having a Ti/TiN multilayered structure. The capacitor 11 includes a lower electrode 24, a barium strontium titanate film 25, and an upper electrode 26. The lower electrode 24 is made of platinum (Pt) formed on the glue layer 23. The barium strontium titanate film 25 having a composition of $(Ba_{0.63}Sr_{0.37})(Fe,Al)_{0.001}Y_{0.013}Ti_{0.986}O_3$ is formed on the lower electrode 24, and has a thickness d of 80 nm. The upper electrode 26 is made of Pt and formed on the BST film 25. The substrate 21 is not limited to a silicon substrate, and may be made of another material.

In the variable capacitor 10, a semiconductor chip 27 serving as the direct-current voltage source 12 is formed on an extended portion of the lower electrode 24. A commercially available IC chip, such as one available from Fujitsu Co. Ltd., may be used as the semiconductor chip 27 through flip-chip mounting.

Figure 4C:
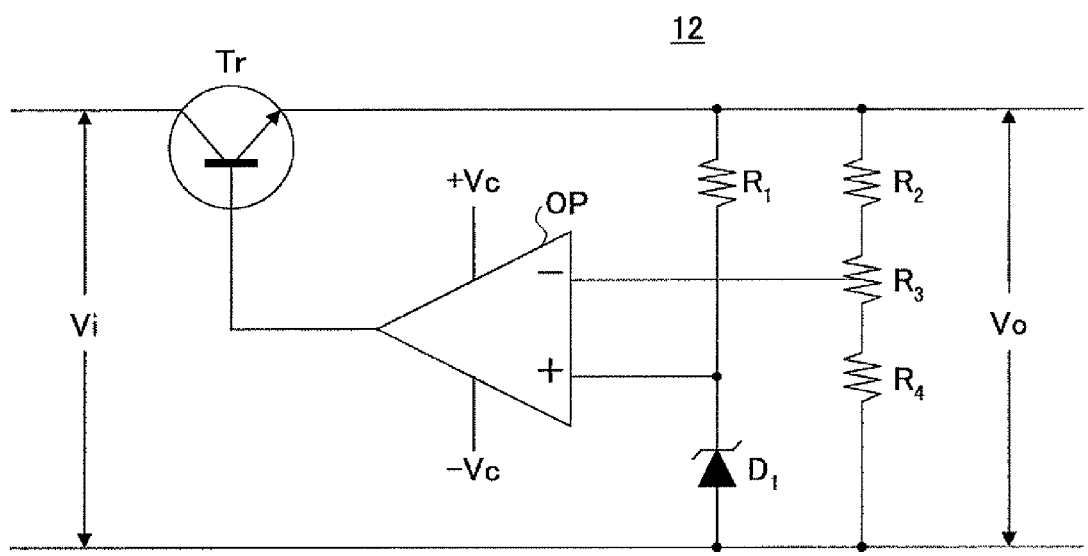
FIG. 4C is a drawing illustrating a direct-current voltage source used in the first embodiment.

FIG. 4C is a circuit diagram illustrating an example of the direct-current voltage source 12.

Referring to FIG. 4C, the direct-current voltage source 12 has a configuration in which a bipolar transistor Tr receiving an input voltage Vi is combined with an operational amplifier OP operating with power supply voltages Vc and −Vc. In the circuit illustrated in FIG. 4C, the operational amplifier OP receives a voltage proportional to an output voltage Vo from a potential divider comprised of resistors R2, R3, and R4, and compares the received voltage with a reference voltage generated by a resistor R1 and a diode D2 from the output voltage of the transistor Tr thereby to control the bipolar transistor Tr. Needless to say, the direct-current voltage source 12 is not limited to the configuration illustrated in FIG. 4C.

In the present embodiment, the glue layer 23, the lower electrode 24, the metal oxide film 25, and the upper electrode 26 may be formed by sputtering.

In the variable capacitor 10 illustrated in FIG. 4A and FIG. 4B, the bias voltage Voff generated by the direct-current voltage source 12 is either +3.6 V or −3.6 V according to expression (5) previously described.

Figure 5A:
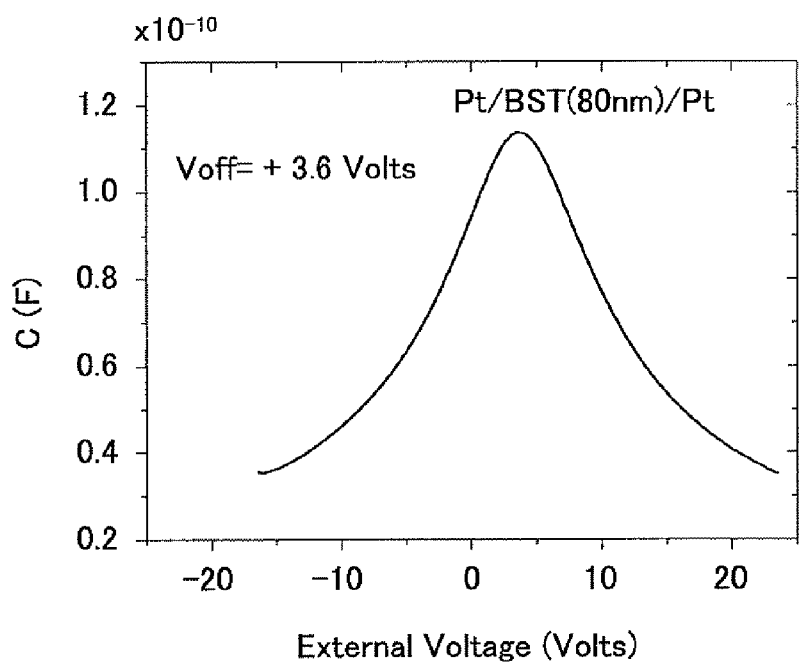
FIG. 5A is a drawing illustrating an example of the characteristics of the variable capacitor according to the first embodiment.
Figure 5B:
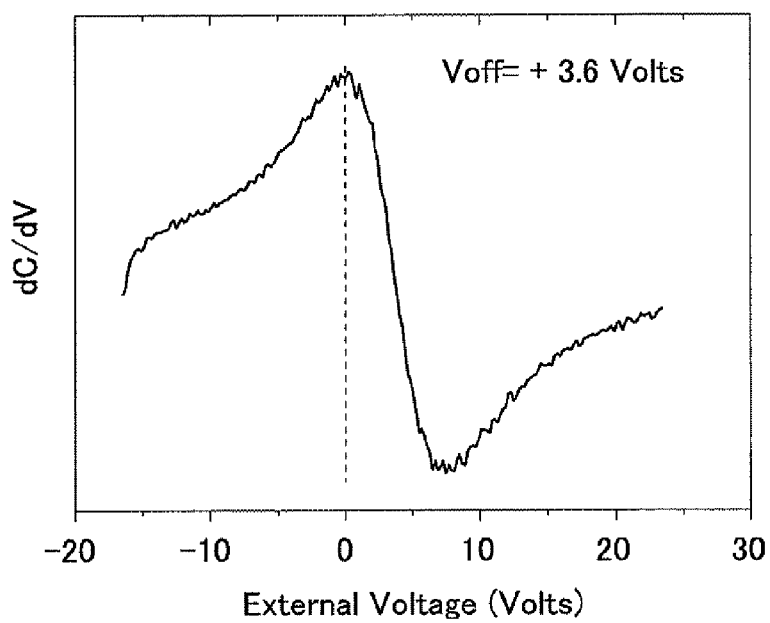
FIG. 5B is a drawing illustrating an example of the characteristics of the variable capacitor according to the first embodiment.

FIGS. 5A and 5B are drawings illustrating a capacitance-voltage characteristic curve and differential coefficient dC/dV, respectively, as obtained when the direct-current voltage source 12 generates a direct-current voltage of +3.6 V as the bias voltage Voff in the variable capacitor 10 illustrated in FIGS. 4A and 4B.

As can be seen from FIGS. 5A and 5B, the capacitance-voltage characteristic curve illustrated in FIG. 5A is shifted towards positive voltages along the axis representing the drive voltage Vext as a result of the application of the bias voltage Voff. Further, the rate of capacitance change in response to a voltage change is the maximum when the drive voltage Vext is 0 V.

Figure 6A:
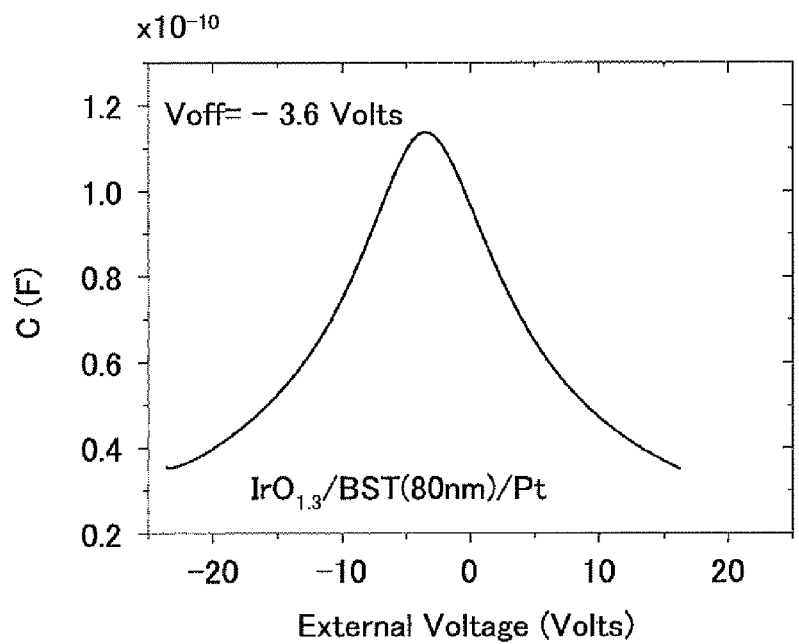
FIG. 6A is a drawing illustrating another example of the characteristics of the variable capacitor according to the first embodiment.
Figure 6B:
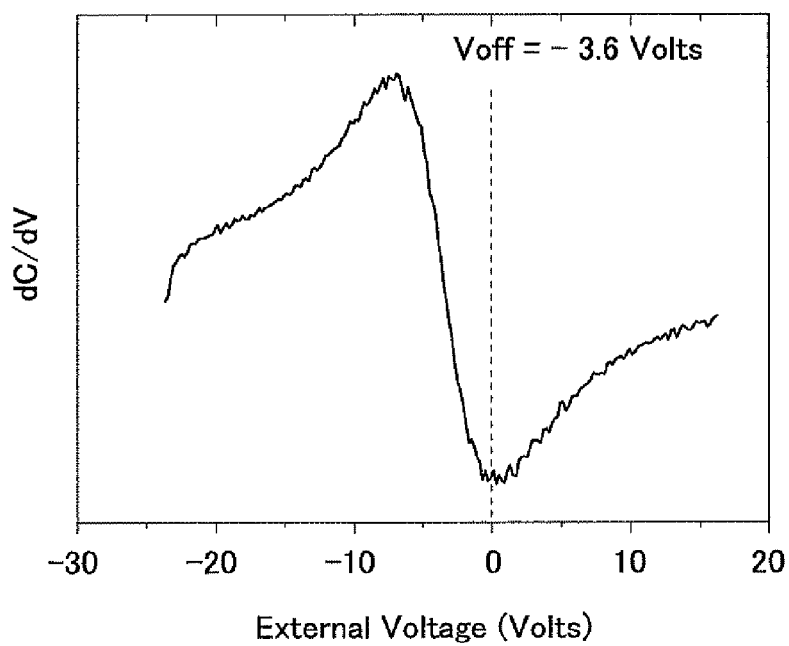
FIG. 6B is a drawing illustrating another example of the characteristics of the variable capacitor according to the first embodiment.

FIGS. 6A and 6B are drawings illustrating a capacitance-voltage characteristic curve and differential coefficient dC/dV, respectively, as obtained when the direct-current voltage source 12 generates a direct-current voltage of −3.6 V as the bias voltage Voff in the variable capacitor 10 illustrated in FIGS. 4A and 4B.

As can be seen from FIGS. 6A and 6B, the capacitance-voltage characteristic curve illustrated in FIG. 6A is shifted towards negative voltages along the axis representing the drive voltage Vext as a result of the application of the bias voltage Voff. Further, the rate of capacitance change in response to a voltage change is the maximum when the drive voltage Vext is 0 V.

In FIG. 3 previously described, the maximum value of the voltage dependency of the relative permittivity ϵ exhibits a temperature dependency. The voltage dependency is relatively large in a temperature range of −40 to +40 degrees Celsius. When the temperature exceeds 120 degrees Celsius, the voltage dependency drops.

In consideration of this, temperature-dependent changes in the relative permittivity ϵ of the BST film 25 were examined for various bias voltages Voff with respect to the variable capacitor 10 illustrated in FIGS. 4A and 4B.

Figure 7:
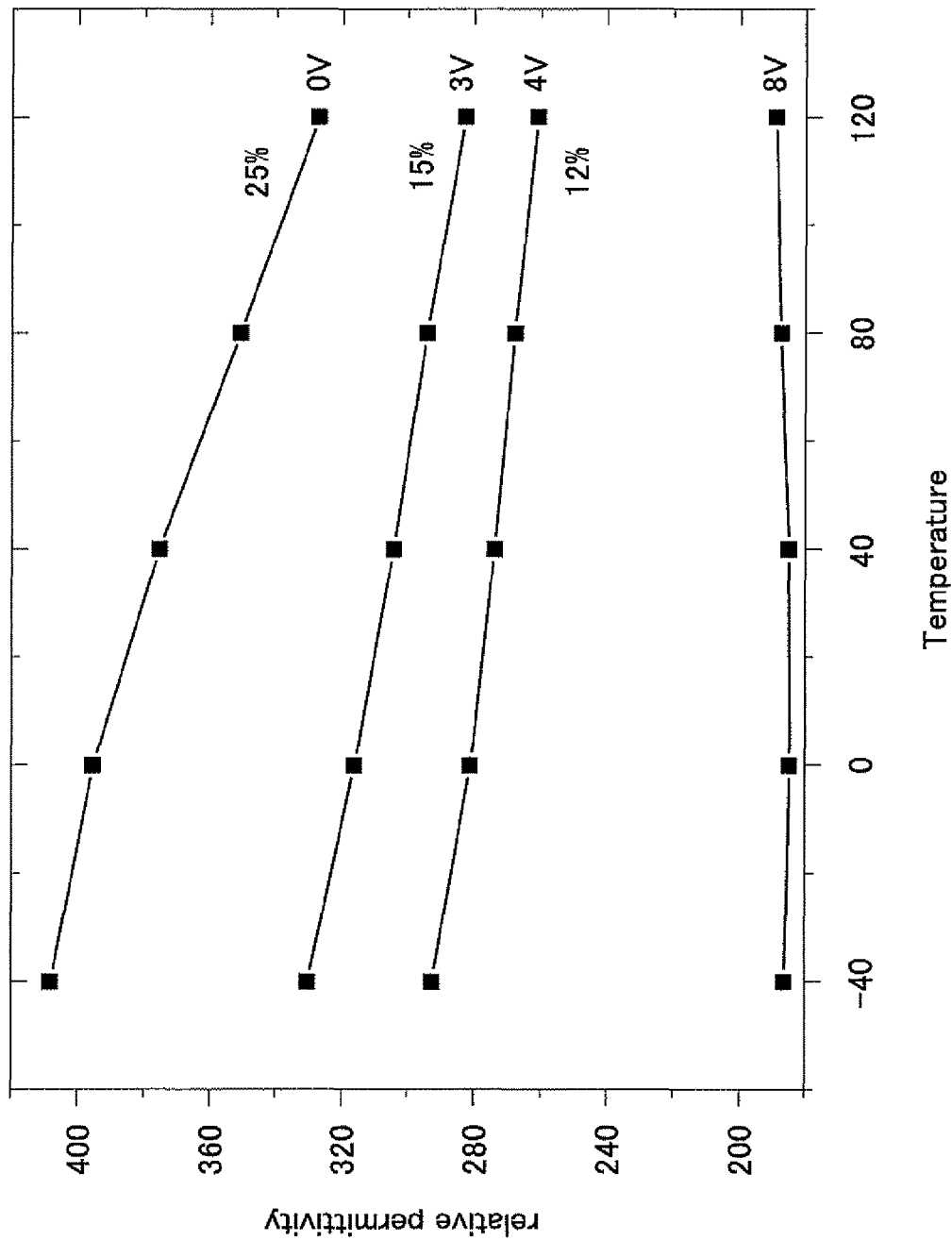
FIG. 7 is a drawing illustrating the temperature characteristics of the variable capacitor according to the first embodiment.

FIG. 7 shows the results of the above-noted examination.

As illustrated in FIG. 7, the relative permittivity ϵ decreases 25% with the temperature change from −40 degrees Celsius to +120 degrees Celsius when the bias voltage Voff is 0 V. A rate of decrease in the relative permittivity ϵ drops as the bias voltage Voff increases. A rate of decrease is 15% for 3 V, 12% for 4 V, and almost zero for 8 V.

The results illustrated in FIG. 7 indicate that the term "3bD$^2$" (i.e., parameter "b") that becomes predominant upon a high voltage being applied in expression (2) does not exhibit a substantial temperature dependency. This fact well matches the Landau-Ginzburg-Devonshire theory.

As can be seen from FIG. 7, a capacitance change responsive to an applied voltage change decreases more or less for the variable capacitor 10 illustrated in FIGS. 4A and 4B when an operating temperature increases. As far as the temperature dependency of the value of the relative permittivity ϵ is concerned, it almost disappears when the drive voltage Vext is sufficiently high.

In the present embodiment, the metal oxide film 25 is not limited to the BST film. A material used as the metal oxide film 25 may be perovskite having a structural formula of $ABO_3$ wherein A is a univalent, bivalent, or trivalent metal, and B is an element in the IVB group, the VB group, the VIB group, the VIIB group, or the IB group of the periodic table. Such material includes lithium tantalate, barium titanate, strontium titanate, barium strontium titanate, bismuth titanate, strontium bismuth tantalate, strontium bismuth niobate, strontium bismuth niobate tantalate, zirconate titanate, lead lanthanum zirconate titanate, potassium niobate, and lead magnesium niobate. In such materials, generally, parameter "a" in expression (1) previously described assumes a value larger than $10^3$ cm/F and not exceeding $10^{12}$ cm/F, and parameter "b" assumes a value smaller than $10^{21}$ cm$^2$/C$^2$F.

Further, a material used as the lower electrode 24 and the upper electrode 26 may include, in addition to Pt, palladium, iridium, ruthenium, rhodium, rhenium, osmium, platinum oxide, iridium oxide, ruthenium oxide, gold, silver, and copper.

When an interface between the metal oxide film 25 and one of the lower electrode 24 and the upper electrode 26 has a defect in the variable capacitor 10 illustrated in FIG. 4B, a built-in offset voltage ΔV may be generated due to such a defect. In this case, the direct-current voltage source 12 generates the bias voltage Voff according to formula (6) previously described such that the effect of the built-in offset voltage ΔV is canceled out.

As will be described in a subsequent embodiment, a built-in offset voltage ΔV is also generated between the upper electrode 26 and the lower electrode 24 when conductive materials having different work functions are used for the upper electrode 26 and the lower electrode 24, respectively. In such a case, the bias voltage Voff generated by the direct-current voltage source 12 is set such that the built-in offset voltage is canceled out.

The present embodiment has been described with reference to a case in which the capacitor 11 is a thin-film capacitor. Nonetheless, the present embodiment is also applicable to a case in which the capacitor 11 is a thick-film capacitor.

It should be noted that the variable capacitor 10 illustrated in FIGS. 4A and 4B may be used as a decoupling capacitor as it is.

Second Embodiment

Figure 8B:
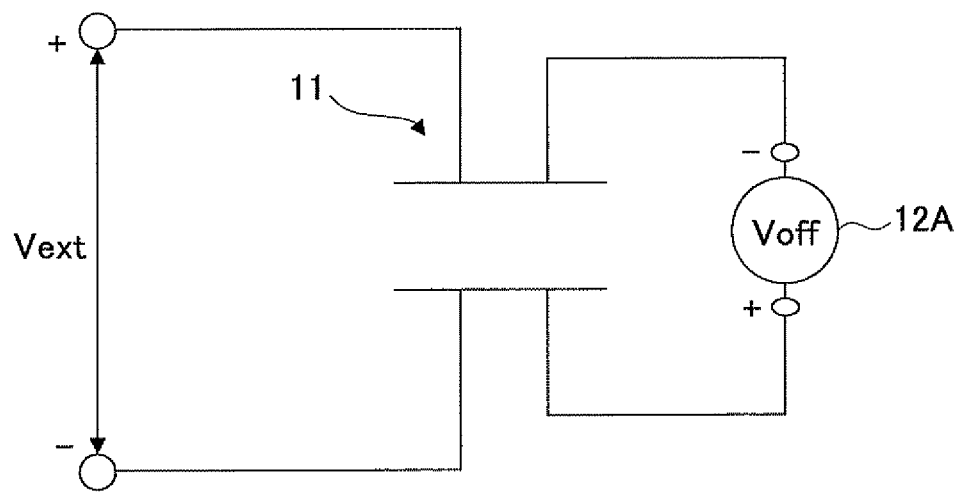
FIGS. 8B and 8C are equivalent circuit diagrams of the variable capacitor of FIG. 8A.

FIG. 8A is a drawing illustrating the configuration of a variable capacitor 40 according to a second embodiment, while FIG. 8B shows the equivalent circuit diagram of the variable capacitor 40.

Figure 8C:
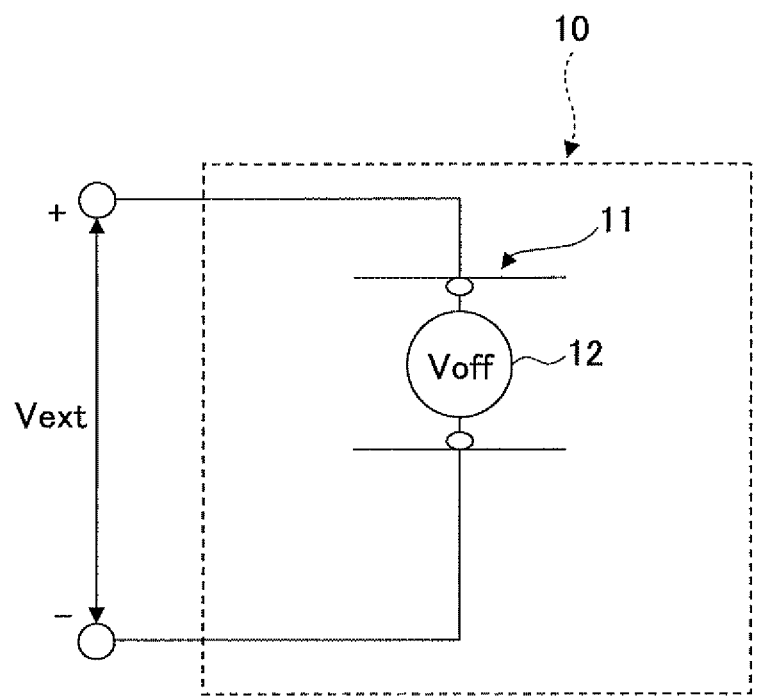

Referring to FIG. 8B first, there is connected an effective direct current voltage source 12A across the top electrode and the bottom electrode of the capacitor 11, wherein the effective direct current voltage source 12A induces a voltage bias or bias electric field between the top and bottom electrodes with polarity as illustrated. FIG. 8B can be represented also as shown in FIG. 8C.

Referring now to FIG. 8A, the thin-film capacitor 11 of the variable capacitor 40 includes a lower electrode 44, a barium strontium titanate film 45, and an upper electrode 46. The lower electrode 44 is made of platinum (Pt) formed on a glue layer 43 made of Ti or having a Ti/N multilayered structure, and is formed on a silicon substrate 41 having an insulating film 42 thereon with the glue layer 43 intervening therebetween. The barium strontium titanate film 45 having a composition of $(Ba_{0.63}Sr_{0.37})(Fe, Al)_{0.001}Y_{0.013}Ti_{0.986}O_3$ is formed on the lower electrode 45, and has a thickness d of 80 nm. The upper electrode 46 is made of Pt and formed on the BST film 45. The substrate 41 is not limited to a silicon substrate, and may be made of another material.

In the present embodiment, the glue layer 43, the lower electrode 44, the metal oxide film 45, and the upper electrode 46 may be formed by sputtering.

In the variable capacitor 40, further, Mn-element ion is doped into a portion of the metal oxide film 45 near the interface with the upper electrode 46 to a depth (t) of 0 to 100 nm, preferably to a depth of 1 nm, with a density of $1\times10^{15}$ cm$^{-3}$ to $1\times10^{21}$ cm$^{-3}$, preferably with a density of $1\times10^{19}$ cm$^{-3}$, thereby forming an impurity doped region 45A. Such ion implantation may be performed under an acceleration voltage of 150 keV with a dose amount of $1\times10^{13}$ cm$^{-2}$ to $1\times10^{17}$ cm$^{-2}$, for example.

The impurity doped region 45A formed in this manner deliberately creates a built-in voltage Voff approximately equal to +3.5 V in the capacitor 11, thereby serving as the direct-current voltage source 12A shown in FIG. 8B.

With such an arrangement, the variable capacitor 40 of the present embodiment achieves the capacitance-voltage characteristic curve and the voltage dependency of capacitance as was described in connection with FIGS. 5A and 5B.

The impurity doped region 45A is not limited to Mn-ion implantation. Such a region may be formed by implanting an ion of another element such as Nb, La, or Y. In so doing, the depth t of the impurity doped region 45A is not limited to 1 nm, and may be increased or decreased depending on a required bias voltage Voff.

In the present embodiment, the metal oxide film 45 is not limited to the BST film. A material used as the metal oxide film 45 may be perovskite having a structural formula of $ABO_3$ wherein A is a univalent, bivalent, or trivalent metal, and B is an element in the IVB group, the VB group, the VIB group, the VIIB group, or the IB group of the periodic table. Such material includes lithium tantalate, barium titanate, strontium titanate, bismuth titanate, strontium bismuth tantalate, strontium bismuth niobate, strontium bismuth niobate tantalate, zirconate titanate, lead lanthanum zirconate titanate, potassium niobate, and lead magnesium niobate in addition to barium strontium titanate.

Further, a material used as the lower electrode 44 and the upper electrode 46 may include, in addition to Pt, palladium, iridium, ruthenium, rhodium, rhenium, osmium, platinum oxide, iridium oxide, ruthenium oxide, gold, silver, and copper.

The present embodiment has been described with reference to a case in which the capacitor 11 is a thin-film capacitor. Nonetheless, the present embodiment is also applicable to a case in which the capacitor 11 is a thick-film capacitor.

It should be noted that the variable capacitor 40 illustrated in FIG. 8A may be used as a decoupling capacitor as it is.

Third Embodiment

FIG. 9 is a drawing illustrating the configuration of a variable capacitor 60 according to a third embodiment. The equivalent circuit diagram of the variable capacitor 60 is the same as the equivalent circuit diagram illustrated in FIG. 8A.

Referring to FIG. 9, the thin-film capacitor 11 of the variable capacitor 60 includes a lower electrode 64, a barium strontium titanate film 65, and an upper electrode 66. The lower electrode 64 is made of platinum (Pt) formed on a glue layer 63 made of Ti or having a Ti/N multilayered structure, and is formed on a silicon substrate 61 having an insulating film 62 thereon with the glue layer 63 intervening therebetween. The barium strontium titanate film 65 having a composition of $(Ba_{0.63}Sr_{0.37})(Fe, Al)_{0.001}Y_{0.013}Ti_{0.986}O_3$ is formed on the lower electrode 64, and has a thickness d of 80 nm. The upper electrode 66 is formed on the BST film 65. The substrate 41 is not limited to a silicon substrate, and may be made of another material.

In the present embodiment, the glue layer 63, the lower electrode 64, the metal oxide film 65, and the upper electrode 66 may be formed by sputtering.

In the present embodiment, a Pt film is used as the lower electrode 64 while an iridium oxide film having a composition of $IrO_{1.3}$ is used as the upper electrode 66.

In the variable capacitor 60 illustrated in FIG. 9, a difference in work functions between Pt and $IrO_{1.3}$ creates a built-in bias voltage of approximately −3.5 V between the lower electrode 64 and the upper electrode 66. As a result, the upper electrode 66 serves as the direct-current voltage source 12 for generating a bias voltage that is applied in series to the variable capacitor 60.

With such an arrangement, the variable capacitor 60 of the present embodiment achieves the capacitance-voltage characteristic curve and the voltage dependency of capacitance as was described in connection with FIGS. 6A and 6B.

Figure 10:
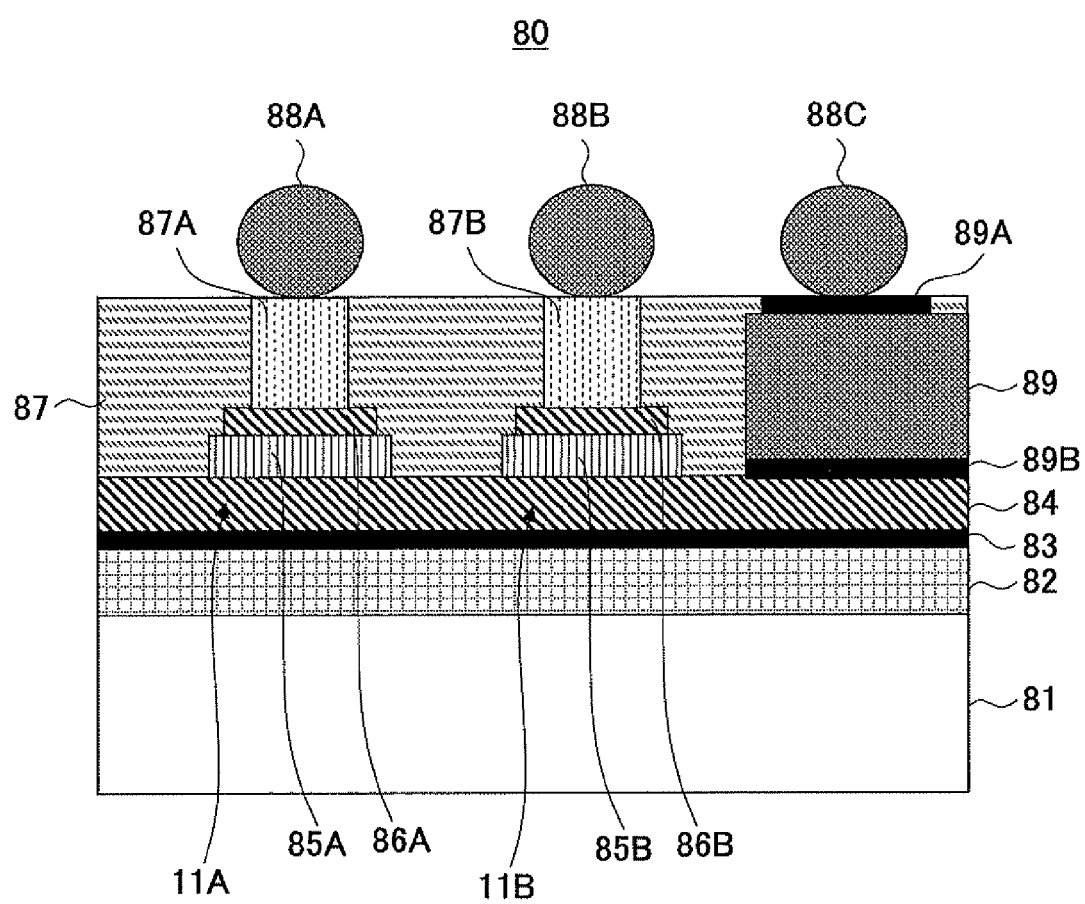
FIG. 10 is a drawing illustrating a decoupling capacitor according to a fourth embodiment.

The present embodiment may be modified as illustrated in FIG. 10 in which the lower electrode 64 is made of an iridium oxide film, and the upper electrode 66 is made of a Pt film.

In the present embodiment, further, the lower electrode 64 may be made of one of Pt, palladium, iridium, ruthenium, rhodium, rhenium, osmium, platinum oxide, iridium oxide, ruthenium oxide, gold, silver, and copper while the upper electrode 66 may be made of a material selected from Pt, palladium, iridium, ruthenium, rhodium, rhenium, osmium, platinum oxide, iridium oxide, ruthenium oxide, gold, silver, and copper such that the selected material differs from the material of the lower electrode 64, and has a work function that can create a desired bias voltage Voff as a built-in voltage.

In the present embodiment, the metal oxide film 65 is not limited to the BST film. A material used as the metal oxide film 65 may be perovskite having a structural formula of $ABO_3$ wherein A is a univalent, bivalent, or trivalent metal, and B is an element in the IVB group, the VB group, the VIB group, the VIIB group, or the IB group of the periodic table. Such material includes lithium tantalate, barium titanate, strontium titanate, bismuth titanate, strontium bismuth tantalate, strontium bismuth niobate, strontium bismuth niobate tantalate, zirconate titanate, lead lanthanum zirconate titanate, potassium niobate, and lead magnesium niobate in addition to barium strontium titanate.

The present embodiment has been described with reference to a case in which the capacitor 11 is a thin-film capacitor. Nonetheless, the present embodiment is also applicable to a case in which the capacitor 11 is a thick-film capacitor.

It should be noted that the variable capacitor 60 illustrated in FIG. 9 may be used as a decoupling capacitor as it is.

Fourth Embodiment

FIG. 10 is a drawing illustrating a decoupling capacitor 80 utilizing the variable capacitor 10 of the first embodiment.

Referring to FIG. 10, the decoupling capacitor 80 is formed on a silicon substrate 81 having a thermal oxide film 82 thereon, with a Ti/TiN glue layer 83 intervening therebetween. The decoupling capacitor 80 includes a lower electrode 84 made of Pt, a first BST-film pattern 85A and a second BST-film pattern 85B formed on the lower electrode 84, and first and second upper electrode patterns 86A and 86B made of Pt formed on the BST-film patterns 85A and 85B, respectively. The lower electrode 84, the first BST-film pattern 85A, and the first upper electrode 86A together constitute a first thin-film capacitor 11A, and the lower electrode 84, the second BST-film pattern 85B, and the second upper electrode 86B together constitute a second thin-film capacitor 11B.

The first and second capacitors 11A and 11B are covered with a resin film 87. In the resin film 87, a plug 87A for coupling to the upper electrode 86A and a plug 87B for coupling to the upper electrode 86B are formed.

An IC chip 89 including an output electrode 89B and an input electrode 89A to constitute a direct-current voltage source is flip-chip mounted on the lower electrode 84, with the output electrode 89B being in contact with the Pt lower electrode 84. The resin film 87 covers the IC chip 89 while exposing the input electrode 89A.

Solder balls 88A, 88B, and 88C are formed on the plug 87A, the plug 87B, and the input electrode 89A of the IC chip 89, respectively.

In the decoupling capacitor illustrated in FIG. 10, the IC chip 89 is driven to apply a predetermined bias voltage Voff to the lower electrode 84 through the output electrode 89B. With this configuration, the application of the drive voltage Vext supplied from an external voltage source (not shown) in addition to the bias voltage Voff can cause the capacitances of the capacitors 11A and 11B to readily match a desired impedance of the signal system or power supply system into which the capacitors 11A and 11B are to be inserted.

Figure 11:
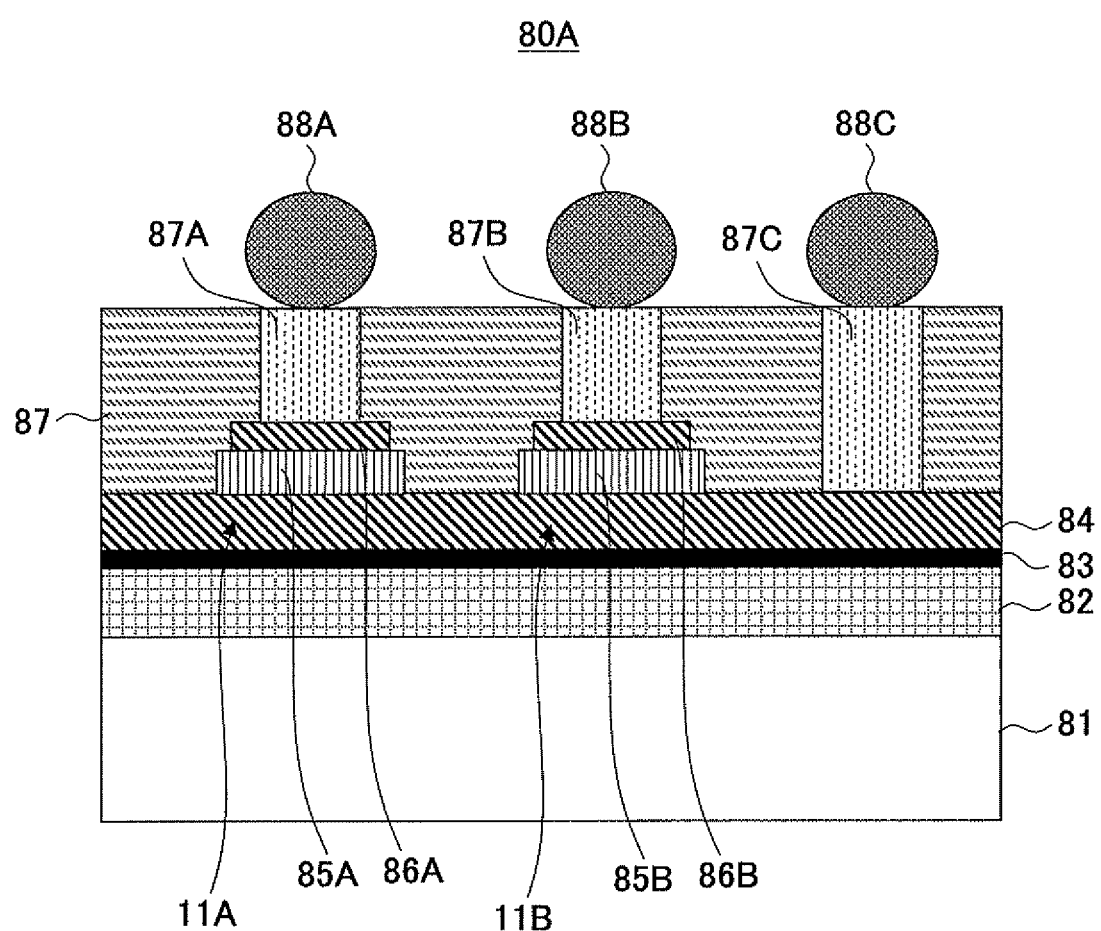
FIG. 11 is a drawing showing a variation of the configuration illustrated in FIG. 10.

FIG. 11 is a drawing illustrating a decoupling capacitor 80A that is a variation of the decoupling capacitor 80 illustrated in FIG. 10.

Referring to FIG. 10, the bias voltage Voff is generated as a built-in voltage inside the capacitors 11A and 11B in the present embodiment in the same manner as in the embodiments illustrated in FIG. 8 and FIG. 9. Accordingly, the IC chip 89 is removed in the configuration illustrated in FIG. 10. With this arrangement, the device structure is simplified in the present embodiment.

Other features are the same as those illustrated in FIG. 10, a description thereof is omitted.

Fifth Embodiment

Figure 12:
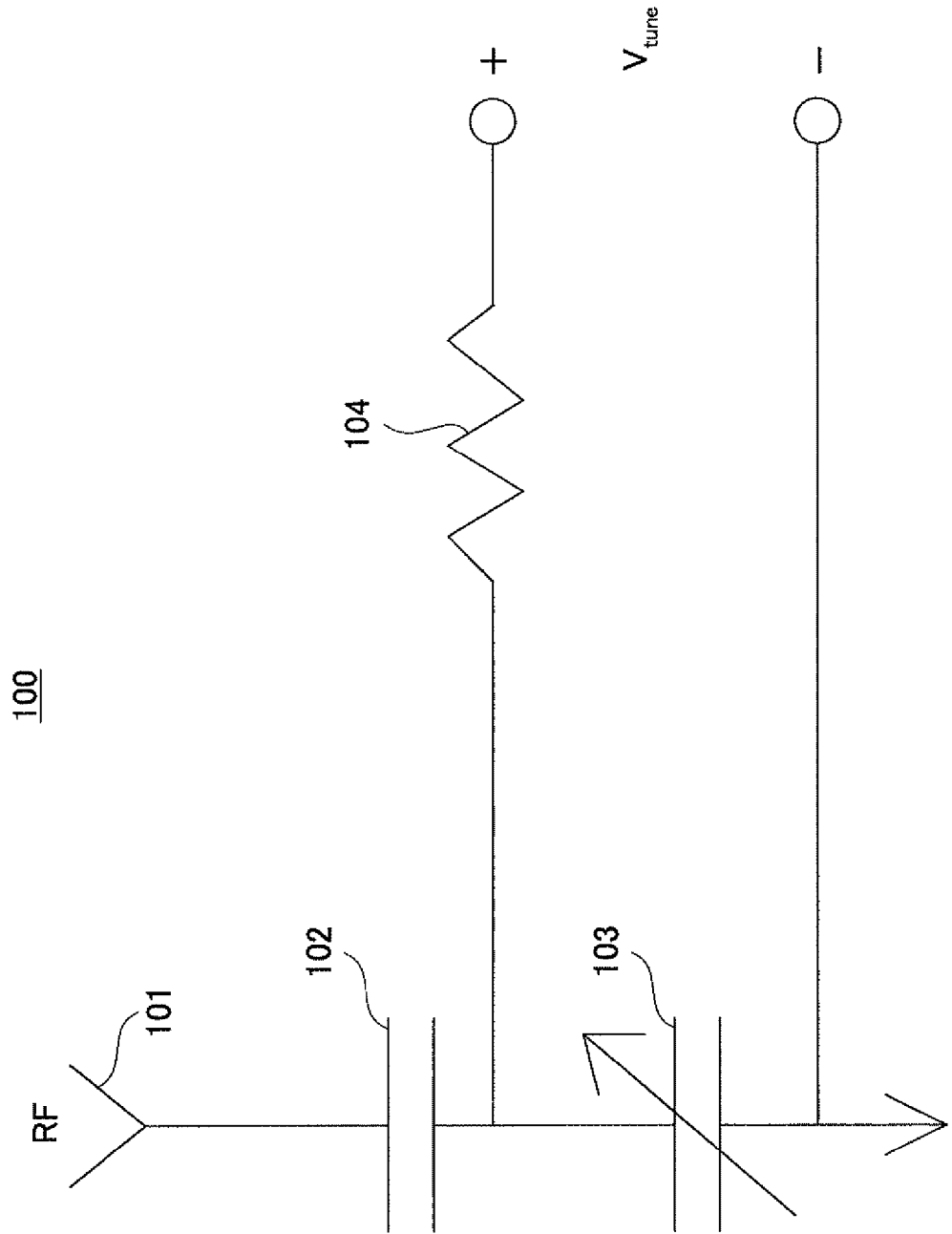
FIG. 12 is a drawing illustrating a tunable circuit according to a fifth embodiment.

FIG. 12 is a drawing illustrating the configuration of a tunable filter circuit 100 according to a fifth embodiment.

Referring to FIG. 12, the tunable filter circuit 100 includes an antenna or input port 101 for receiving a high-frequency signal, and further includes a blocking capacitor 102 and a variable capacitor 103 connected in series to the input port 101. The variable capacitor 103 receives a control voltage Vtune through a resistor 104 to change the capacitance thereof.

In the present embodiment, the variable capacitor 10, 40, or 60 as previously described is used as the variable capacitor 103. With this provision, the tuned frequency can be changed over a wide frequency range by use of a small control voltage Vtune. The control voltage Vtune corresponds to the drive voltage described in connection with FIG. 4A.

Sixth Embodiment

Figure 13A:
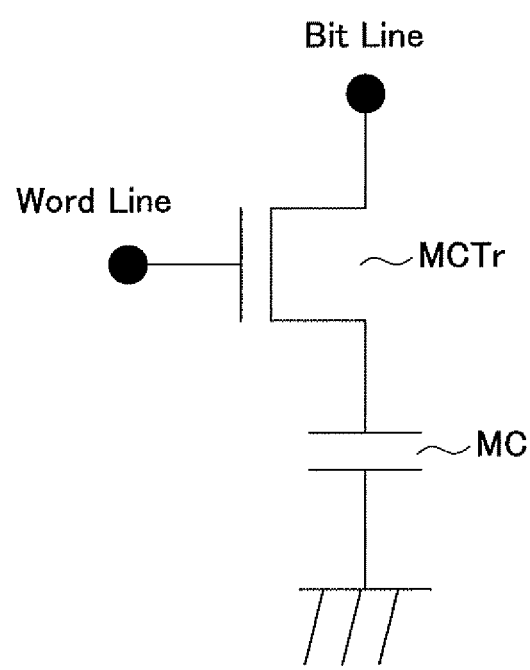
FIG. 13A is an equivalent circuit diagram of a DRAM according to a sixth embodiment.
Figure 13B:
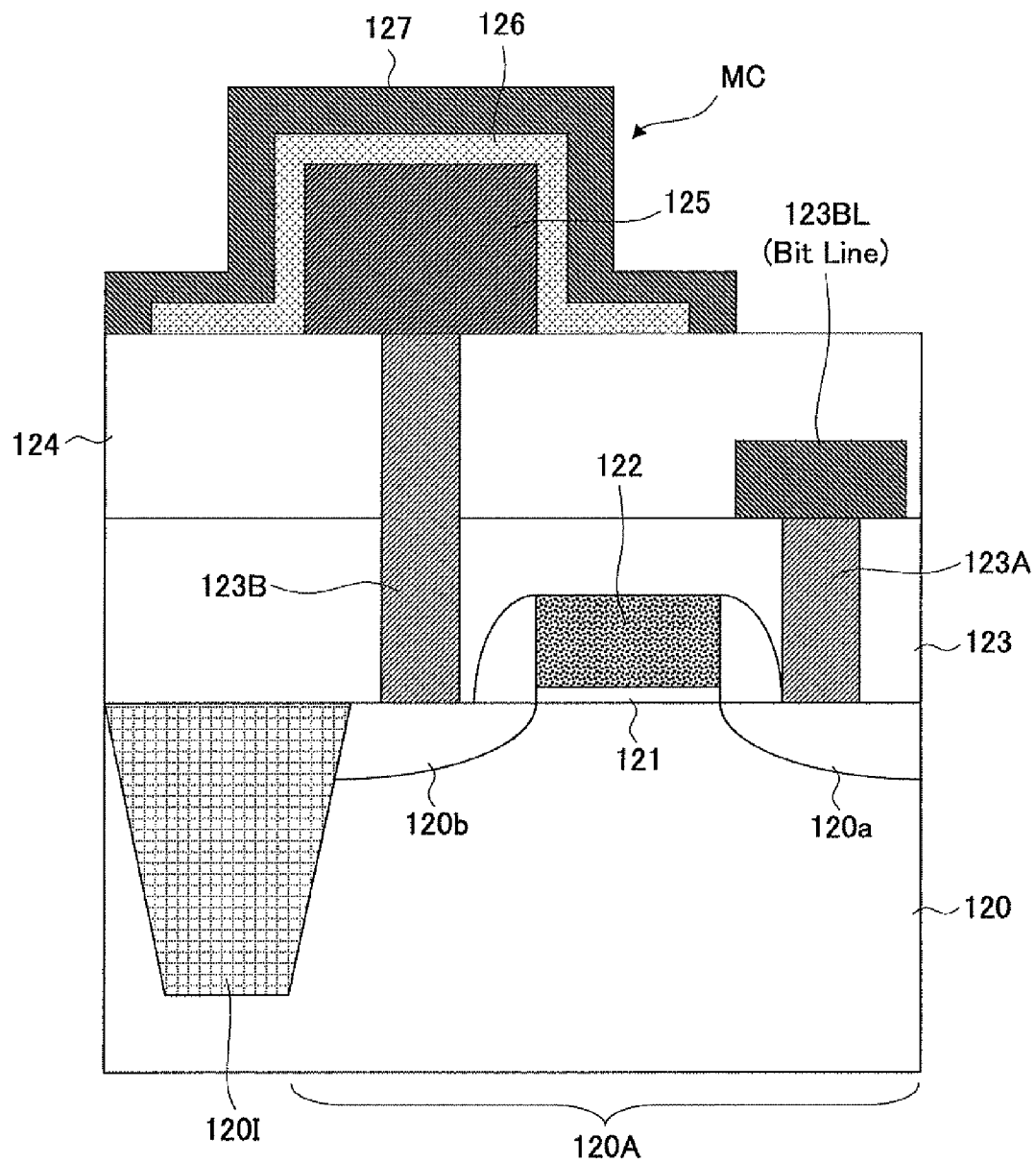
FIG. 13B is a drawing illustrating the DRAM according to the sixth embodiment.

FIGS. 13A and 13B are drawings illustrating the configuration of a DRAM according to a sixth embodiment. FIG. 13A illustrates an equivalent circuit diagram of one of the memory cells of the DRAM, and FIG. 13B illustrates a cross-sectional view of such a memory cell.

Referring to the equivalent circuit diagram illustrated in FIG. 13A, the memory cell of the DRAM includes a memory cell transistor MCTr that has the gate thereof coupled to a word line, the source thereof coupled to a bit line, and the drain thereof coupled to a memory cell capacitor MC.

Referring to the cross-sectional view illustrated in FIG. 13B, the memory cell is implemented in a device area 120A that is defined by a device isolation region 120I formed in a silicon substrate 120. In the device area 120A, a gate electrode 122 is formed on the silicon substrate 120 with an gate isolating film 121 intervening therebetween. In the device area 120A, a source diffusion region 120a and a drain diffusion region 120b are formed in the silicon substrate 120 on either side of the gate electrode 122.

The gate electrode 122 is covered with an insulating film 123 formed on the silicon substrate 120. A bitline pattern 123BL is formed on the insulating film 123. The bitline pattern 123BL is coupled to the source diffusion region 120a through a via plug 123A formed in the insulating film 123.

An interlayer insulating film 124 is formed on the insulating film 123 to cover the bitline pattern 123BL. A lower electrode 125 of the memory cell capacitor MC is formed on the interlayer insulating film 124. The lower electrode 125 is in contact with the drain diffusion region 120b through a via plug 123B penetrating through the insulating film 123 and the interlayer insulating film 124.

A capacitor insulating film 126 made of BST or the like is formed on the lower electrode 125. Further, a plate electrode 127 is formed on the capacitor insulating film 126.

In the DRAM of the present embodiment, an impurity element is doped into a surface portion of the capacitor insulating film 126. Alternatively, a conductive material different from the conductive material of the lower electrode 125 is used for the plate electrode 127. This arrangement serves to generate a built-in voltage in the memory cell capacitor MC.

In the above-noted arrangement, the material or film thickness of the capacitor insulating film 126 is optimized by taking into account the level of the built-in voltage. In this manner, the capacitance of the memory cell capacitor MC can be adjusted to become the maximum in an operating condition with an applied voltage.

Further, the present invention is not limited to these embodiments, but various variations and modifications may be made without departing from the scope of the present invention.

According to at least one embodiment, a bias voltage is applied in advance to a variable capacitor, thereby causing the variable capacitor to operate around an operating point where the voltage dependency of the capacitance is the largest.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A variable capacitor, comprising:
a metal oxide film having a perovskite structure;
first and second electrode films having the metal oxide film placed therebetween and to be coupled to an external voltage source; and
a bias voltage source configured to provide a bias voltage that is applied in series to a capacitance of a capacitor including the metal oxide film and the first and second electrode films,
wherein the bias voltage applied by the bias voltage source to the capacitance is set equal to a voltage at which a differential coefficient of a relative permittivity of the metal oxide film with respect to a voltage of the external voltage source has a peak.

2. The variable capacitor as claimed in claim 1, wherein the first and second electrode films each have an area size A, and the metal oxide film has a film thickness d, and wherein an accumulated electric charge Q and a capacitance C of the capacitor are expressed by use of parameters a and b as:

$$V=(ad/A)Q+(bd/A^3)Q^3,$$

and wherein the bias voltage source is configured to generate Voff as the bias voltage:

$$V\text{off}=\pm[(6a^3/126b)^{1/2}+(6a/126b^{1/3})^{3/2}]d.$$

3. The variable capacitor as claimed in claim 1, wherein the metal oxide film has a structural formula of $ABO_3$ wherein A is a univalent, bivalent, or trivalent metal, and B is an element in a IVB group, a VB group, a VIB group, a VIIB group, or a IB group of a periodic table.

4. The variable capacitor as claimed in claim 3, wherein the metal oxide film is one of lithium tantalate, barium titanate, strontium titanate, barium strontium titanate, bismuth titanate, strontium bismuth tantalate, strontium bismuth niobate, strontium bismuth niobate tantalate, zirconate titanate, lead lanthanum zirconate titanate, potassium niobate, and lead magnesium niobate.

5. The variable capacitor as claimed in claim 1, wherein the metal oxide film is made of $BaSrTiO_3$ and has a film thickness of 80 nm, and wherein the bias voltage source is configured to generate a direct-current bias voltage of +3.6 V or −3.6V.

6. The variable capacitor as claimed in claim 1, wherein the bias voltage source is separate from the capacitor.

7. The variable capacitor as claimed in claim 1, wherein the first and second electrode films are conductive films having different work functions, which are placed on both sides of the metal oxide film to constitute the bias voltage source.

8. The variable capacitor as claimed in claim 7, wherein the first electrode film is one of platinum, palladium, iridium, ruthenium, rhodium, rhenium, osmium, platinum oxide, iridium oxide, ruthenium oxide, gold, silver, and copper, and the second electrode film is one of platinum, palladium, iridium, ruthenium, rhodium, rhenium, osmium, platinum oxide, iridium oxide, ruthenium oxide, gold, silver, and copper.

9. The variable capacitor as claimed in claim 7, wherein one of the first and second electrode films is made of platinum, and another one of the first and second electrode films is made of iridium oxide.

10. A variable capacitor, comprising:
a metal oxide film having a perovskite structure;
first and second electrode films having the metal oxide film placed therebetween and to be coupled to an external voltage source; and
a bias voltage source configured to provide a bias voltage that is applied in parallel to a capacitance of a capacitor including the metal oxide film and the first and second electrode films,
wherein the bias voltage applied by the bias voltage source to the capacitance is set equal to a voltage at which a differential coefficient of a relative permittivity of the metal oxide film with respect to a voltage of the external voltage source has a peak,
wherein the bias voltage source is formed as an integral, interior part of the capacitor.

11. The variable capacitor as claimed in claim 10, wherein the bias voltage source is an impurity doped region formed in the metal oxide film at an interface thereof with one of the first and second electrode films.

12. The variable capacitor as claimed in claim 11, wherein the impurity doped region includes an impurity element selected from a group consisting of Nb, La, Y, and Mn, and is formed to a depth ranging from 0 nm to 1000 nm.

13. The variable capacitor as claimed in claim 11, wherein the metal oxide film is made of $BaSrTiO_3$, and the impurity doped region includes an Mn element.

14. The variable capacitor as claimed in claim 13, wherein the impurity doped region has a depth of 0 nm to 1000 nm, and includes an Mn element with a density of $1 \times 10^{13}$ $cm^{-3}$ to $1 \times 10^{17}$ $cm^3$.

15. A filter circuit, comprising:
a signal input node; and
a variable capacitor series-coupled to the signal input node, the variable capacitor including:
a metal oxide film having a perovskite structure;
first and second electrode films having the metal oxide film placed therebetween and to be coupled to an external voltage source; and
a bias voltage source configured to provide a bias voltage that is applied in series to a capacitance of a capacitor including the metal oxide film and the first and second electrode films,
wherein the bias voltage applied by the bias voltage source to the capacitance is set equal to a voltage at which a differential coefficient of a relative permittivity of the metal oxide film with respect to a voltage of the external voltage source has a peak, and a drive voltage is applied to the variable capacitor to change the capacitance.

16. A filter circuit, comprising:
a signal input node; and
a variable capacitor series-coupled to the signal input node, the variable capacitor including:
a metal oxide film having a perovskite structure;
first and second electrode films having the metal oxide film placed therebetween and to be coupled to an external voltage source; and
a bias voltage source configured to provide a bias voltage that is applied in parallel to a capacitance of a capacitor including the metal oxide film and the first and second electrode films,
wherein the bias voltage applied by the bias voltage source to the capacitance is set equal to a voltage at which a differential coefficient of a relative permittivity of the metal oxide film with respect to a voltage of the external voltage source has a peak, and a drive voltage is applied to the variable capacitor to change the capacitance.

* * * * *